US012661863B2

(12) United States Patent

Schaefer et al.

(10) Patent No.: US 12,661,863 B2

(45) Date of Patent: Jun. 23, 2026

(54) TPU FOR INMOLD ASSEMBLY OF AN OUTER SHOE SOLE ON eTPU

(71) Applicant: BASF SE, Ludwigshafen am Rhein (DE)

(72) Inventors: Frank Schaefer, Lemfoerde (DE); Elmar Poeselt, Lemfoerde (DE); Florian Schulz, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 864 days.

(21) Appl. No.: 17/904,918

(22) PCT Filed: Feb. 26, 2021

(86) PCT No.: PCT/EP2021/054827

§ 371 (c)(1),
(2) Date: Aug. 24, 2022

(87) PCT Pub. No.: WO2021/170801

PCT Pub. Date: Sep. 2, 2021

(65) Prior Publication Data

US 2023/0087981 A1 Mar. 23, 2023

(30) Foreign Application Priority Data

Feb. 28, 2020 (EP) .................................... 20160021

(51) Int. Cl.
*B32B 5/18* (2006.01)
*B29D 35/12* (2010.01)
(Continued)

(52) U.S. Cl.
CPC .............. *B32B 5/18* (2013.01); *B29D 35/122* (2013.01); *B32B 7/027* (2019.01); *B32B 27/065* (2013.01);
(Continued)

(58) Field of Classification Search
None
See application file for complete search history.

(56) References Cited

U.S. PATENT DOCUMENTS 8,507,633 B2 8/2013 Henze et al.
9,714,332 B2 7/2017 Prissok et al.
(Continued)

FOREIGN PATENT DOCUMENTS

EP 3 248 493 11/2017
JP 2013-220354 A 10/2013
(Continued)

OTHER PUBLICATIONS

International Search Report dated May 31, 2021, in PCT/EP2021/054827, with English translation, 7 pages.
(Continued)

*Primary Examiner* — Chinessa T. Golden
(74) *Attorney, Agent, or Firm* — Grüneberg Global IP, PLLC

(57) ABSTRACT

A molded article (M) contains a molded article (M-1) made of a thermoplastic elastomer (TPE-1) and a foamed pellet material made of a thermoplastic elastomer (TPE-2). The molded article (M-1) has a softening temperature TS (TPE-1) that deviates by no more than 25° C. from the processing temperature TP (TPE-2) of the thermoplastic elastomer (TPE-2). The softening temperature is determined by TMA in accordance with ISO 11359-3:2014. A process can be used for producing the molded article. The molded article can be used for application in the sports, industry, medicine, sports medicine, safety, automotive and consumer goods field, especially as a shoe sole, a part of a shoe sole, a bicycle saddle, a cushioning, a mattress, an underlay, a grip, a protective film, or a component in automobile interiors and exteriors.

17 Claims, 1 Drawing Sheet

Comparative example 1
Comparative example 2
Comparative example 3
Comparative example 4
Example 1
Example 2
Example 4
Example 5
Example 6

(51) Int. Cl.

| | |
|---|---|
| *B32B 7/027* | (2019.01) |
| *B32B 27/06* | (2006.01) |
| *B32B 27/40* | (2006.01) |
| *C08G 18/32* | (2006.01) |
| *C08G 18/48* | (2006.01) |
| *C08J 9/232* | (2006.01) |

(52) U.S. Cl.

CPC .......... *B32B 27/40* (2013.01); *C08G 18/3206* (2013.01); *C08G 18/4854* (2013.01); *C08J 9/232* (2013.01); *B32B 2266/0278* (2013.01); *B32B 2266/0292* (2013.01); *B32B 2274/00* (2013.01); *B32B 2437/02* (2013.01); *C08G 2410/00* (2013.01); *C08J 2201/03* (2013.01); *C08J 2375/04* (2013.01)

(56) References Cited

U.S. PATENT DOCUMENTS

| | | | |
|---|---|---|---|
| 10,501,596 B2 | 12/2019 | Prissok et al. | |
| 11,053,368 B2 | 7/2021 | Prissok et al. | |
| 2010/0047550 A1* | 2/2010 | Prissok .............. | C08G 18/3206 |
| | | | 428/313.5 |
| 2015/0197617 A1* | 7/2015 | Prissok ...................... | C08J 9/35 |
| | | | 521/137 |
| 2018/0112053 A1* | 4/2018 | Martin ................ | B29C 44/1285 |

FOREIGN PATENT DOCUMENTS

| | | |
|---|---|---|
| WO | 94/20568 | 9/1994 |
| WO | 2007/082838 | 7/2007 |
| WO | 2007/118827 | 10/2007 |
| WO | 2008/087078 | 7/2008 |
| WO | 101583656 A | 11/2009 |
| WO | 2014/023794 | 2/2014 |
| WO | 2016/187442 | 11/2016 |
| WO | 2019/150493 A1 | 8/2019 |
| WO | 2019/202716 A1 | 10/2019 |

OTHER PUBLICATIONS

International Preliminary Report dated Sep. 1, 2022, in PCT/EP2021/054827, with English translation, 31 pages.

Kunststoffhandbuch, Band 7, Polyurethane [Plastics Handbook, vol. 7, Polyurethanes], Carl Hanser Verlag, 3rd edition 1993, chapter 3.1., 1993, pp. 57-127.

Kunststoffhandbuch [Plastics Handbook], vol. VII, edited by Vieweg and Höchtlen, Carl Hanser Verlag, Munich 1966 (pp. 103-113), 1966, pp. 96-120.

Sorenson et al., "Preparative Methods of Polymer Chemistry", Interscience Publishers Inc., 1961, pp. 111-127.

Smith, et al., Preparation and Properties of Poly (methylene terephthalates), Journal of Polymers Science: Part A-1, vol. 4, 1966, pp. 1851-1859.

Ullmann's "Encyklopädie der technischen Chemie" [Encyclopedia of Industrial Chemistry], 4th edition, vol. 20, p. 416 ff., obtained Jul. 30, 2020, pp. 415-432.

Written Opinion dated May 31, 2021, in PCT/EP2021/054827, with English translation, 13 pages.

Office Action issued in Japanese Patent Application No. 2022-552187 dated Jan. 21, 2025, (with English machine translation) 10 pages.

* cited by examiner

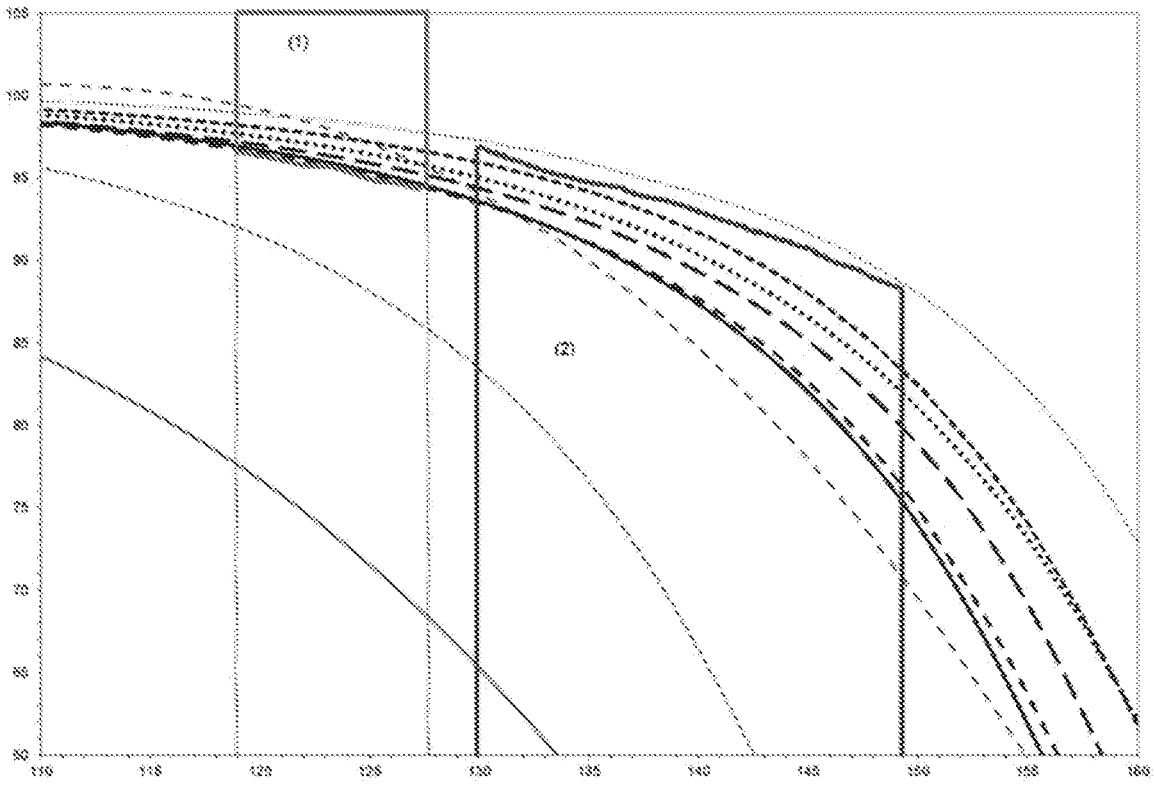
| | |
|---|---|
| ~~~~~~~~~~ | Comparative example 1 |
| ─── ─── | Comparative example 2 |
| ─ ─ ─ ─ | Comparative example 3 |
| · · · · · · | Comparative example 4 |
| ▬▬▬▬▬ | Example 1 |
| ── ── | Example 2 |
| ── ── ── | Example 4 |
| ● ● ● ● | Example 5 |
| ▬▬▬▬▬ | Example 6 |

TPU FOR INMOLD ASSEMBLY OF AN OUTER SHOE SOLE ON eTPU

CROSS-REFERENCE TO RELATED APPLICATIONS

This application is the National Stage entry under § 371 of International Application No. PCT/EP2021/054827, filed on Feb. 26, 2021, and which claims the benefit of priority to European Application No. 20160021.0, filed on Feb. 28, 2020. The content of each of these applications is hereby incorporated by reference in its entirety.

BACKGROUND OF THE INVENTION

Field of the Invention

The present invention relates to a molded article (M) comprising a molded article (M-1) made of a thermoplastic elastomer (TPE-1) and a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014. The present invention further relates to a process for producing a molded article according to the invention and to the use for application in the sports, industry, medicine, sports medicine, safety, automotive and consumer goods field, especially as shoe sole, part of a shoe sole, as bicycle saddle, cushioning, mattress, underlay, grip, protective film, or component in automobile interiors and exteriors.

Description of Related Art

Foams, including in particular particle foams, have long been known and have been described many times in the literature, for example in Ullmann's "Encyklopädie der technischen Chemie" [Encyclopedia of Industrial Chemistry], 4th edition, volume 20, pp. 416 ff.

Highly elastic, closed-cell foams, such as particle foams made of thermoplastic polyurethane, that are produced in an autoclave or by the extruder method show good mechanical properties and in some cases also good resilience. Hybrid foams composed of particles of thermoplastic elastomers and system foam or binders are also known. Depending on the foam density, the manner of production, and the matrix material, it is possible to produce a relatively broad range of stiffness levels overall. Aftertreatment of the foam, such as heat treatment, can also influence the properties of the foam.

Particle foams based on thermoplastic polyurethane, also referred to as TPU in this document, are disclosed in WO 94/20568 A1. A disadvantage of the TPU foams described in WO 94/20568 is the high energy expenditure in production and processing. A water vapor pressure of 4.5 bar to 7 bar is employed at temperatures of 145° C. to 165° C. In addition, WO 94/20568 describes expanded, i.e. foamed, TPU particles that can be processed to give moldings. These TPU foam particles are produced at temperatures of 150° C. or higher and, as shown by the examples, have a bulk density between 55 and 180 g/L, which is disadvantageous for transport and storage of these particles owing to the elevated space demands.

WO 2007/082838 A1 discloses a particle foam based on a thermoplastic polyurethane, the thermoplastic polyurethane having a Shore hardness between A 44 and A 84. The Shore hardness of the TPU is measured on the compact, i.e. unexpanded, TPU. Moreover, WO 2007/082838 A1 discloses processes for producing expandable, preferably particulate, blowing agent-containing thermoplastic polyurethane and processes for producing expanded thermoplastic polyurethane and processes for producing foam based on thermoplastic polyurethane and foams or expanded thermoplastic polyurethanes obtainable in this way.

However, it is found that although it is frequently possible to achieve good mechanical properties, the processing of the particles, especially in combination with further components, is complex. For instance, depending on the processing method, it may be necessary to use further materials, for example an additional adhesive. Also, when processing in the case of a process in which foamed particles are welded in the presence of a component, there may for example be problems in terms of adhesion and shape retention of the contours of the components.

SUMMARY OF THE INVENTION

An object of the present invention was therefore that of providing processes for producing a molded article from compact components and foamed particles or foamed pellet materials, in which the components can easily be combined with one another and a stable bond is obtained. A further object of the present invention was that of providing the corresponding molded articles.

According to the invention, this object is achieved by a molded article (M) comprising a molded article (M-1) made of a thermoplastic elastomer (TPE-1) and a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014.

DETAILED DESCRIPTION OF THE INVENTION

In the context of the present invention, the softening temperature of the molded article (M-1) is determined by means of TMA in accordance with ISO 11359-3:2014. Unless stated otherwise, the softening temperature is usually determined here at the surface of the molded article. The measurement is usually performed on non-heat-treated samples.

In the context of the present invention, the processing temperature is understood to be the temperature or the temperature range at which the foamed pellet materials can be processed into a molded article, i.e. the temperature at which there is sufficient softening at the surface of the foamed pellet materials to be able to bond individual particles to one another while at the same time largely retaining the cellular structure of the foamed pellet material.

Unless stated otherwise, the processing temperature of the foamed pellet material is determined by DSC measurements. In the context of the present invention, the processing temperature is the temperature range in which, in a DSC measurement of the pre-dried sample, the melting endotherm(s) of the hard phase lie. In the context of the present invention and unless stated otherwise, DSC measurements are performed on pre-dried samples with a heating rate of 20 K/min in accordance with DIN 11357-3:2013. Pre-drying is usually effected for 10 minutes at 100° C. The pre-drying may for example be effected directly in the DSC apparatus. In this case, the start of the endotherm(s) for a 10 mg TPU sample that had been pre-dried in the DSC apparatus for 10 minutes at 100° C. directly prior to measurement is determined in accordance with DIN EN 11357-1:2016 and DIN EN 11357-3:2013.

Unless stated otherwise, the TMA and DSC are measured with the same heating rate of 20 K/min.

It has surprisingly been found that the softening behavior at the surface of the component is decisive for good adhesion and must be similar to the softening behavior of the foamed pellet material used in order for there to be sufficient adhesion of both components of the molded article.

It has been found that processing can be effected well in particular in a processing temperature range TP of the thermoplastic elastomer TPE-2, where this temperature range lies in the range from 10% above the lowest temperature of the endotherm determined by DSC to 10% below the maximum temperature of the endotherm determined by DSC.

Particularly good results were achieved when the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

According to a further embodiment, the present invention also relates to a molded article as described above, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

The processing temperature or the processing temperature range may vary depending on the chemical nature of thermoplastic elastomer. Typically, the processing temperature is in a range from 100 to 170° C., preferably in a range from 110 to 160° C., more preferably in a range from 120 to 150° C.

According to a further embodiment, the present invention also relates to a molded article as described above, wherein the processing temperature range of the thermoplastic elastomer (TPE-2) TP (TPE-2) is in the range from 100 to 170° C.

The molded article according to the invention comprises a molded article (M-1) made of a thermoplastic elastomer (TPE-1) and a foamed pellet material made of a thermoplastic elastomer (TPE-2). The thermoplastic elastomer (TPE-1) is preferably in compact form.

Suitable thermoplastic elastomers are known per se to those skilled in the art. For example, the thermoplastic elastomer (TPE-1) may be a thermoplastic polyurethane, a thermoplastic polyetheramide, a polyetherester, a polyesterester, a crosslinked thermoplastic olefin-based elastomer or a thermoplastic vulcanizate, or a thermoplastic styrene-butadiene block copolymer. According to the invention, the thermoplastic elastomer (TPE-1) may preferably be a thermoplastic polyurethane, a thermoplastic polyetheramide, a polyetherester, a polyesterester or a thermoplastic styrene-butadiene block copolymer.

According to a further embodiment, the present invention accordingly also relates to a particle foam as described above, wherein the thermoplastic elastomer (TPE-1) is selected from the group consisting of thermoplastic polyurethanes, thermoplastic polyetheramides, polyetheresters, polyesteresters or thermoplastic styrene-butadiene block copolymers.

Irrespective of this, in the context of the present invention, the thermoplastic elastomer (TPE-2) may also be selected from the group consisting of thermoplastic polyurethanes, thermoplastic polyetheramides, polyetheresters, polyesteresters, thermoplastic olefin-based elastomers, crosslinked thermoplastic olefin-based elastomers or thermoplastic vulcanizates, or thermoplastic styrene-butadiene block copolymers, as long as it is ensured that the softening behavior of the thermoplastic elastomers used is matched to one another as specified. According to the invention, if the thermoplastic elastomer (TPE-1) is selected from the group consisting of thermoplastic polyurethanes, thermoplastic polyetheramides, polyetheresters or polyesteresters, it is preferable for the thermoplastic elastomer (TPE-2) to also be selected from this group. If the thermoplastic elastomer (TPE-1) is selected from the group consisting of thermoplastic olefin-based elastomers, crosslinked thermoplastic olefin-based elastomers or thermoplastic vulcanizates, or thermoplastic styrene-butadiene block copolymers, it is preferable in the context of the present invention for the thermoplastic elastomer (TPE-2) to also be selected from this group.

Suitable thermoplastic polyetheresters and polyesteresters can be produced according to any standard methods known from the literature by transesterification or esterification of aromatic and aliphatic dicarboxylic acids having 4 to 20 carbon atoms or esters thereof with suitable aliphatic and aromatic di- and polyols (cf. "Polymer Chemistry", Interscience Publ., New York, 1961, pp. 111-127; Kunststoffhandbuch [Plastics Handbook], volume VIII, C. Hanser Verlag, Munich 1973 and Journal of Polymer Science, Part A1, 4, pages 1851-1859 (1966)).

Examples of suitable aromatic dicarboxylic acids include phthalic acid, iso- and terephthalic acid and esters thereof. Suitable aliphatic dicarboxylic acids include, for example, cyclohexane-1,4-dicarboxylic acid, adipic acid, sebacic acid, azelaic acid and decanedicarboxylic acid as saturated dicarboxylic acids, and maleic acid, fumaric acid, aconitic acid, itaconic acid, tetrahydrophthalic acid and tetrahydroterephthalic acid as unsaturated dicarboxylic acids.

Examples of suitable diol components include diols of general formula HO—(CH2)n-OH where n=2 to 20, such as ethylene glycol, propane-1,3-diol, butane-1,4-diol or hexane-1,6-diol, polyetherols of general formula HO—(CH2)n-O—(CH2)m-OH where n is equal or unequal to m and n and m=2 to 20, unsaturated diols and polyetherols, for example butene-1,4-diol; diols and polyetherols comprising aromatic units; and polyesterols.

In addition to the recited carboxylic acids and esters thereof and the recited alcohols, it is possible to use any other standard representatives of these compound classes to provide the polyetheresters and polyesteresters used in accordance with the invention.

The thermoplastic polyetheramides can be obtained according to any standard methods known from the literature by reaction of amines and carboxylic acids or esters thereof.

Amines and/or carboxylic acid here additionally comprise ether units of type R—O—R, where R=organic radical (aliphatic and/or aromatic). In general, monomers of the following compound classes are used: HOOC—R'—NH2 where R' may be aromatic and aliphatic, preferably comprising ether units of the R—O—R type where R=organic radical (aliphatic and/or aromatic); aromatic dicarboxylic acids including, for example, phthalic acid, iso- and terephthalic acid or esters thereof and aromatic dicarboxylic acids comprising ether units of the R—O—R type where R=organic radical (aliphatic and/or aromatic); aliphatic dicarboxylic acids including, for example, cyclohexane-1, 4-dicarboxylic acid, adipic acid, sebacic acid, azelaic acid and decanedicarboxylic acid as saturated dicarboxylic acids, and maleic acid, fumaric acid, aconitic acid, itaconic acid, tetrahydrophthalic acid and tetrahydroterephthalic acid as unsaturated and aliphatic dicarboxylic acids comprising ether units of the R—O—R type where R=organic radical (aliphatic and/or aromatic); diamines of the general formula H2N—R''—NH2 where R'' may be aromatic and aliphatic, preferably comprising ether units of the R—O—R type where R=organic radical (aliphatic and/or aromatic); lactams, for example ε-caprolactam, pyrrolidone or laurolactam; and amino acids.

In addition to the recited carboxylic acids and esters thereof and the recited amines, lactams and amino acids, it is possible to use any other standard representatives of these compound classes to provide the polyetheramine used in accordance with the invention.

The thermoplastic elastomers having block copolymer structure that are used in accordance with the invention preferably comprise vinylaromatic units, butadiene units and isoprene units, and polyolefin units and vinylic units, for example ethylene, propylene and vinyl acetate units. Preference is given to styrene-butadiene copolymers.

The thermoplastic elastomers having block copolymer structure, polyetheramides, polyetheresters and polyesteresters that are used in accordance with the invention are preferably selected such that the melting points thereof are ≤300° C., preferably ≤250° C., especially ≤220° C.

The thermoplastic elastomers having block copolymer structure, polyetheramides, polyetheresters and polyesteresters that are used in accordance with the invention may be semicrystalline or amorphous.

In the context of the present invention, the thermoplastic elastomer (TPE-1) is particularly advantageously a thermoplastic polyurethane.

The thermoplastic elastomer (TPE-2) may also be, in accordance with the invention, a thermoplastic polyurethane, a thermoplastic polyetheramide, a polyetherester, a polyesterester or a thermoplastic styrene-butadiene block copolymer. According to a further embodiment, the present invention accordingly also relates to a molded article as described above, wherein the thermoplastic elastomer (TPE-2) is selected from the group consisting of thermoplastic polyurethanes, thermoplastic polyetheramides, polyetheresters, polyesteresters or thermoplastic styrene-butadiene block copolymers.

The molded articles according to the invention have particularly advantageous property profiles when the thermoplastic elastomer (TPE-2) is a thermoplastic polyurethane. According to a further embodiment, the present invention also relates to a molded article as described above, wherein the thermoplastic elastomers (TPE-1) and (TPE-2) are independently selected from thermoplastic polyurethanes, thermoplastic polyesters and thermoplastic polyamides.

Good properties were observed in particular when both the thermoplastic elastomer (TPE-1) and the thermoplastic elastomer (TPE-2) are selected from thermoplastic polyurethanes. According to a further embodiment, the present invention also relates to a molded article as described above, wherein the thermoplastic elastomer (TPE-1) and the thermoplastic elastomer (TPE-2) are selected from thermoplastic polyurethanes.

Thermoplastic polyurethanes are known from the prior art. They are typically obtained by reaction of a polyisocyanate composition with a polyol composition, where the polyol composition typically comprises a polyol and a chain extender.

In the context of the present invention, thermoplastic polyurethanes obtained or obtainable by reaction of a polyisocyanate composition with a polyol composition are typically used.

According to a further embodiment, the present invention also relates to a molded article as described above, wherein the thermoplastic elastomer (TPE-1) is a thermoplastic polyurethane (TPU-1) obtained or obtainable by reaction of the components (i) to (iii):

(i) a polyisocyanate composition (IC);

(ii) at least one chain extender (CE1), (iii) a polyol composition (PC), wherein the components are reacted at an index in the range from 0.99 to 1.02 and wherein the average molecular weight of the polyols present in the polyol composition (PC) is in the range from 1250 g/mol to 2500 g/mol.

Typically, the polyol composition comprises at least one polyol. Polyols are fundamentally known to those skilled in the art and described for example in "Kunststoffhandbuch, Band 7, Polyurethane" [Plastics Handbook, volume 7, Polyurethanes], Carl Hanser Verlag, 3rd edition 1993, chapter 3.1. Particular preference is given to using polyesterols or polyetherols as polyols. It is likewise possible to use polycarbonates. Copolymers may also be used in the context of the present invention. The number-average molecular weight of the polyols used in accordance with the invention is preferably between $0.5 \times 10^3$ g/mol and $8 \times 10^3$ g/mol, preferably between $0.6 \times 10^3$ g/mol and $5 \times 10^3$ g/mol, especially between $0.8 \times 10^3$ g/mol and $3 \times 10^3$ g/mol.

Polyetherols, but also polyesterols, block copolymers, and hybrid polyols such as poly(ester/amide), are suitable according to the invention. Preferred polyetherols according to the invention are polyethylene glycols, polypropylene glycols, polyadipates, polycarbonates, polycarbonate diols and polycaprolactone.

According to a further embodiment, the present invention also relates to a thermoplastic polyurethane as described above, wherein the polyol composition comprises a polyol selected from the group consisting of polyetherols, polyesterols, polycaprolactones and polycarbonates.

Suitable block copolymers are for example those having ether and ester blocks, for example polycaprolactone having polyethylene oxide or polypropylene oxide end blocks, or else polyethers having polycaprolactone end blocks. Preferred polyetherols according to the invention are polyethylene glycols and polypropylene glycols. Polycaprolactone is also preferred.

According to a particularly preferred embodiment, the polyol used has a molecular weight Mn in the range from 500 g/mol to 4000 g/mol, preferably in the range from 800 g/mol to 3000 g/mol.

According to a further embodiment, the present invention accordingly relates to a thermoplastic polyurethane as described above, wherein at least one polyol present in the polyol composition has a molecular weight Mn in the range from 500 g/mol to 4000 g/mol. According to the invention, the average molecular weight of the polyols present in the polyol composition (PC) is preferably in the range from 1250 g/mol to 2500 g/mol.

It is also possible in accordance with the invention to use mixtures of different polyols. The polyols/polyol composition used preferably have/has an average functionality of between 1.8 and 2.3, preferably between 1.9 and 2.2, in particular 2. The polyols used in accordance with the invention preferably have solely primary hydroxyl groups.

According to one embodiment of the present invention, at least one polyol composition comprising at least polytetrahydrofuran is used for the production of the thermoplastic polyurethane. The polyol composition may according to the invention also comprise further polyols in addition to polytetrahydrofuran.

Further polyols that are suitable according to the invention are for example polyethers, but also polyesters, block copolymers, and also hybrid polyols such as poly(ester/amide). Suitable block copolymers are for example those having ether and ester blocks, for example polycaprolactone having polyethylene oxide or polypropylene oxide end blocks, or else polyethers having polycaprolactone end blocks. Preferred polyetherols according to the invention are polyethylene glycols and polypropylene glycols. Also preferred as a further polyol is polycaprolactone.

Suitable polyols are for example polyetherols such as polytrimethylene oxide or polytetramethylene oxide. According to a further embodiment, the present invention also relates to a molded article as described above, wherein the polyol composition comprises a polyol selected from the group consisting of polyetherols, polyesterols and polycaprolactone polyols.

According to a particularly preferred embodiment, the polytetrahydrofuran has a number-average molecular weight Mn in the range from 500 g/mol to 5000 g/mol, more preferably in the range from 750 to 3000 g/mol, particularly preferably in the range from 1000 to 2500 g/mol. According to a further embodiment, the present invention also relates to a molded article as described previously, wherein the polyol composition comprises a polyol selected from the group consisting of polytetrahydrofurans having a number-average molecular weight Mn in the range from 1400 g/mol to 2200 g/mol. Mixtures of various polytetrahydrofurans may according to the invention also be used, that is to say mixtures of polytetrahydrofurans having different molecular weights.

In the context of the present invention, the composition of the polyol composition may vary within wide ranges. For example the content of the first polyol, preferably of polytetrahydrofuran, may be in the range from 15% to 85%, preferably in the range from 20% to 80%, more preferably in the range from 25% to 75%.

The polyol composition may according to the invention also comprise a solvent. Suitable solvents are known per se to those skilled in the art.

Examples of suitable chain extenders are compounds having at least two isocyanate-reactive functional groups, for example hydroxyl groups, amino groups or thiol groups.

Examples of suitable chain extenders are compounds selected from the group consisting of aliphatic and aromatic diols having a molecular weight of <500 g/mol, preferably <350 g/mol.

It is preferable according to the invention for the chain extenders used to be diols. It is preferable in this case to use aliphatic, araliphatic, aromatic and/or cycloaliphatic diols having a molecular weight of 50 g/mol to 220 g/mol. Preference is given to alkanediols having 2 to 10 carbon atoms in the alkylene radical, in particular di-, tri-, tetra-, penta-, hexa-, hepta-, octa-, nona- and/or decaalkylene glycols. For the present invention, particular preference is given to 1,2-ethylene glycol, propane-1,3-diol, butane-1,4-diol, hexane-1,6-diol.

Also suitable as chain extenders in the context of the present invention are branched compounds such as cyclohexyl-1,4-dimethanol, 2-butyl-2-ethylpropanediol, neopentyl glycol, 2,2,4-trimethylpentane-1,3-diol, pinacol, 2-ethylhexane-1,3-diol, cyclohexane-1,4-diol or N-phenyldiethanolamine. Likewise suitable are mixed compounds such as for example 4-aminobutanol.

According to a further embodiment, the present invention also relates to a molded article as described above, wherein the chain extender (CE1) is selected from the group consisting of ethane-1,2-diol, propane-1,3-diol, butane-1,4-diol and hexane-1,6-diol.

According to the invention, it is also possible to use further chain extenders. According to the invention, it is also possible to use compounds having amino groups, for example diamines. Likewise, it is possible to use mixtures of diols and diamines.

In the context of the present invention, the amount of the chain extender used and of the polyols used may vary within broad ranges.

According to the invention, production of the thermoplastic polyurethane uses a polyisocyanate composition comprising at least one polyisocyanate.

In the context of the present invention, preferred polyisocyanates are diisocyanates, especially aliphatic or aromatic diisocyanates, further preferably aromatic diisocyanates. Suitable isocyanates are known per se to those skilled in the art.

According to the invention it is also possible for the isocyanate composition to comprise 4,4'-methylenediphenyl diisocyanate and at least one further methylenediphenyl diisocyanate. According to the invention the term "methylenediphenyl diisocyanate" is to be understood as meaning diphenylmethane 2,2'-, 2,4'- and/or 4,4'-diisocyanate or a mixture of two or three isomers. Thus employable according to the invention as the further isocyanate are diphenylmethane 2,2'- or 2,4'-diisocyanate or a mixture of two or three isomers. According to the invention the polyisocyanate composition may also comprise further polyisocyanates.

In addition, it is possible to use as the isocyanate components pre-reacted products in which some of the OH components have been reacted with an isocyanate in a preceding reaction step. In a subsequent step, the actual polymer reaction, the products obtained are reacted with the remaining OH components, thus forming the thermoplastic polyurethane.

The aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-iso-cyanatomethylcyclohexane and methylene dicyclohexyl 4,4'-, 2,4'- and/or 2,2'-diisocyanate (H12MDI).

Preferred aliphatic polyisocyanates are hexamethylene 1,6-diisocyanate (HDI), 1-isocyanato-3,3,5-trimethyl-5-iso-cyanatomethylcyclohexane and methylene dicyclohexyl 4,4'-2,4'- and/or 2,2'-diisocyanate (H12MDI); especially preferred are methylene dicyclohexyl 4,4'-, 2,4'- and/or 2,2'-diisocyanate (H12MDI) and 1-isocyanato-3,3,5-trim-ethyl-5-isocyanatomethylcyclohexane or mixtures thereof.

Suitable aromatic diisocyanates are in particular naphth-ylene 1,5-diisocyanate (NDI), tolylene 2,4- and/or 2,6-dii-socyanate (TDI), 3,3'-dimethyl-4,4'-diisocyanatobiphenyl (TODI), p-phenylene diisocyanate (PDI), diphenylethane 4,4'-diisocyanate (EDI), diphenylmethane diisocyanate, dimethyldiphenyl 3,3'-diisocyanate, diphenylethane 1,2-dii-socyanate and/or phenylene diisocyanate.

Particularly suitable in the context of the present inven-tion are for example polyisocyanate compositions compris-ing 4,4'-MDI and 2,4-MDI, polyisocyanate compositions comprising 4,4'-MDI and 3,3'-dimethyl-4,4'-diisocyanatobi-phenyl (TODI) or polyisocyanate compositions comprising 4,4'-MDI and naphthylene 1,5-diisocyanate (NDI).

Three or more isocyanates can also be used according to the invention. The polyisocyanate composition typically comprises 4,4'-MDI in an amount of 2% to 50%, based on the total polyisocyanate composition, and the further iso-cyanate in an amount of 3% to 20%, based on the total polyisocyanate composition.

Preferred examples of higher-functionality isocyanates are triisocyanates, for example triphenylmethane 4,4',4"-triisocyanate, also the cyanurates of the aforementioned diisocyanates, and also the oligomers obtainable by partial reaction of diisocyanates with water, for example the biurets of the aforementioned diisocyanates, and additionally oli-gomers that can be obtained by specific reaction of semi-blocked diisocyanates with polyols having on average more than two and preferably three or more hydroxyl groups.

According to the invention, the polyisocyanate composi-tion may also comprise one or more solvents. Suitable solvents are known to those skilled in the art. Suitable examples are nonreactive solvents such as ethyl acetate, methyl ethyl ketone, and hydrocarbons.

Also furthermore usable within the context of the present invention are crosslinkers, for example the aforementioned higher-functionality polyisocyanates or polyols or else other higher-functionality molecules having a plurality of isocya-nate-reactive functional groups. It is likewise possible in the context of the present invention to achieve crosslinking of the products by having the employed isocyanate groups present in excess in relation to the hydroxyl groups.

According to the invention, the components are used in a ratio such that the molar ratio of the sum of the function-alities of the polyol composition used to the sum of the functionalities of the isocyanate composition used is in the range from 1:0.8 to 1:1.3. The ratio is preferably in the range from 1:0.9 to 1:1.2, more preferably in the range from 1:0.965 to 1:1.11, more preferably in the range from 1:0.97 to 1:1.11, more preferably in the range from 1:0.97 to 1:1.05, particularly preferably in the range from 1:0.98 to 1:1.03.

A further parameter taken into account in the reaction of the components is the isocyanate index. Here, the index is defined via the ratio of all of the isocyanate groups used during the reaction to the isocyanate-reactive groups, i.e. in particular the reactive groups of the polyol component. If the index is 1000, there is one active hydrogen atom for each isocyanate group. At indices above 1000 there are more isocyanate groups than isocyanate-reactive groups. The index in the reaction of the components is preferably in the range from 965 to 1110, for example in the range from 970 to 1110, more preferably in the range from 970 to 1050, particularly preferably in the range from 980 to 1030.

According to the invention, further additives, for example catalysts or auxiliaries and additions, may be added during the production of the thermoplastic polyurethane. Additions and auxiliaries are known per se to those skilled in the art. It is also possible in accordance with the invention to use combinations of two or more additives. Suitable auxiliaries and additions can be found, for example, in Kunststoffhand-buch [Plastics Handbook], volume VII, edited by Vieweg and Höchtlen, Carl Hanser Verlag, Munich 1966 (pp. 103-113).

According to the invention, the thermoplastic polyure-thane used as (TPE-1) preferably has a hard segment content in the range from 10% to 20%, preferably in the range from 14% to 17%. The hard segment content here is the propor-tion of the thermoplastic polyurethane which is formed by isocyanate and chain extender. In the context of the present invention, the hard segment content is determined by the formula disclosed in WO 2007/118827 A1, where a value of 1.0 corresponds to 100%, meaning that a hard segment content of >50% corresponds to a value of >0.50 by the formula specified in WO 2007/118827 A1.

According to the invention, a foamed pellet material made of the thermoplastic elastomer (TPE-2) is used. Processes for producing foamed pellet materials from thermoplastic elastomers are known per se to those skilled in the art. The bulk density of the foamed pellet material is typically in the range from 20 g/l to 200 g/l, preferably 50 g/l to 180 g/l, particularly preferably 60 g/l to 150 g/l.

For example, the diameter of the foamed pellet materials is between 0.5 to 20 mm, preferably 1 to 15 mm, and in particular between 3 to 12 mm. In the case of non-spherical, for example elongate or cylindrical foamed pellet materials, diameter means the longest dimension.

According to a further aspect, the present invention also relates to a process for producing a molded article (M), comprising the steps of:

(a) providing a molded article (M-1), comprising a ther-moplastic elastomer (TPE-1), in a mold, (b) filling the mold with a foamed pellet material com-prising a thermoplastic elastomer (TPE-2), the thermo-plastic elastomer (TPE-2) having a processing tempera-ture TP (TPE-2).

(c) producing the molded article (M) by welding at a temperature in the range from 100 to 170° C.

wherein the molded article (M-1) has a softening tempera-ture TS (TPE-1) that deviates by no more than 25° C. from the processing temperature TP (TPE-2) of the thermoplastic elastomer (TPE-2), the softening temperature being deter-mined by means of TMA in accordance with ISO 11359-3: 2014.

According to a further embodiment, the present invention also relates to a process as described above, wherein the thermoplastic elastomer (TPE-1) has a maximum softening of less than 10% at a temperature below the processing temperature TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014

(weight 15 g, heating rate 20 K/min, round ram of diameter 3 mm, TPU sample geometry: diameter 4 mm and thickness 2 mm).

With regard to the preferred embodiments, reference is made to the statements above.

According to the invention, the molded article (M) is produced by first, according to step (a), providing a molded article (M-1) in a suitable mold, and then, according to step (b), filling the mold with the foamed pellet material comprising the thermoplastic elastomer (TPE-2). The amount of foamed pellet material that is filled into the mold is tailored to the size of the mold and the desired density of the molding. In the context of the present invention, the process may also include further steps, for example temperature adjustments. In the context of the present invention, the molded article (M) may also comprise further components. Accordingly, further moldings or foamed particles made of a different material may be used in the production.

According to step (c), the molded article (M) is produced by welding at a temperature in the range from 100 to 170° C. The temperature during the welding of the expanded particles is preferably between 100° C. and 140° C.

According to step (c), the welding may for example be effected by welding the components together in a closed mold under the action of heat. For this purpose, the components, i.e. at least the foamed pellet material and the molded article (M-1), are introduced into the mold and, after the mold has been closed, water vapor or hot air is introduced, which results in further expansion of the particles of the foamed pellet material and fusion thereof to one another and to the molded article (M-1) to give the foam, preferably having a density in the range from 8 to 600 g/l. The foams may be semifinished products, for example slabs, profiles or sheets, or finished shaped articles having simple or complicated geometry.

In particular, the present invention relates to a process for producing a molded article as described above, wherein the thermoplastic elastomer (TPE-1) and the thermoplastic elastomer (TPE-2) are independently selected from the group consisting of thermoplastic polyurethanes, polyetheresters, polyesteresters and polyetheramides. According to a further embodiment, the present invention also relates to a process as described above, wherein the thermoplastic elastomer (TPE-1) and the thermoplastic elastomer (TPE-2) are selected from thermoplastic polyurethanes.

According to a further aspect, the present invention also relates to a molded article obtained or obtainable by a process as described above.

It is possible with the process according to the invention to easily process different materials, for example including bio-based thermoplastic elastomers, or thermoplastic elastomers of differing coloration, and to very precisely adjust the surface geometry. The process according to the invention makes it possible to dispense with further layers such as adhesive layers.

It is also advantageous that the foams of the invention can be recycled as thermoplastics without difficulty. For this purpose, for example, the foamed materials are extruded using an extruder having a venting device, where the extrusion may optionally be preceded by a mechanical comminution. Thereafter, they can be processed again to give foams in the manner described above.

The present invention also further relates to the use of a molded article (M-1) made of a thermoplastic elastomer (TPE-1) for producing a molded article in the presence of a foamed pellet material made of a thermoplastic elastomer (TPE-2), wherein the molded article (M-1) has a softening temperature TS (TPE-1) at the surface that deviates by no more than 25° C. from the processing temperature TP (TPE-2) of the thermoplastic elastomer (TPE-2), the softening temperature being determined by means of TMA in accordance with ISO 11359-3:2014. According to a further embodiment, the present invention also relates in particular to the use as described above, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

The molded articles of the invention can be used in various fields. According to a further aspect, the present invention also relates to the use of a molded article according to the invention, wherein the molded article is one suitable for an application in the sports, industry, medicine, sports medicine, safety, automotive and consumer goods field. The present invention also further relates to the use of a molded article according to the invention, wherein the molded article is a shoe sole, part of a shoe sole, a bicycle saddle, cushioning, a mattress, underlay, grip, protective film, a component in automobile interiors and exteriors. The molded articles according to the invention are particularly suitable for use as shoe outer sole.

Further embodiments of the present invention can be found in the description and the examples. It will be appreciated that the features of the article/process/uses according to the invention recited above and elucidated hereinbelow may be used not only in the respectively specified combination but also in other combinations without departing from the scope of the invention. Thus, for example, the combination of a preferred feature with a particularly preferred feature, or of a feature not characterized further with a particularly preferred feature etc., is also encompassed implicitly even if this combination is not mentioned explicitly.

Illustrative embodiments of the present invention are detailed hereinbelow, but are not intended to limit the present invention. In particular, the present invention also encompasses those embodiments that result from the dependency references and hence combinations specified hereinbelow. More particularly, it is pointed out that, where a range of embodiments is mentioned, for example in connection with the expression "according to any of embodiments 1 to 4", the intention is that each of the embodiments within said range is explicitly disclosed. The phrase will be considered by those skilled in the art to be synonymous with the phrase "according to any of embodiments 1, 2, 3, and 4", It is explicitly stated that the following embodiments are a structured part of the description relating to general and preferred aspects of the present invention.

1. A molded article (M) comprising a molded article (M-1) made of a thermoplastic elastomer (TPE-1) and a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014.

2. The molded article according to embodiment 1, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

3. The molded article according to either of embodiments 1 and 2, wherein the processing temperature range of the thermoplastic elastomer (TPE-2) TP (TPE-2) is in the range from 100 to 170° C.

4. The molded article according to any of embodiments 1 to 3, wherein the thermoplastic elastomers (TPE-1) and (TPE-2) are independently selected from thermoplastic polyurethanes, thermoplastic polyesters and thermoplastic polyamides.

5. The molded article according to any of embodiments 1 to 4, wherein the thermoplastic elastomer (TPE-1) and the thermoplastic elastomer (TPE-2) are selected from thermoplastic polyurethanes.

6. The molded article according to any of embodiments 1 to 5, wherein the thermoplastic elastomer (TPE-1) is a thermoplastic polyurethane (TPU-1) obtained or obtainable by reaction of the components (i) to (iii):
   (i) a polyisocyanate composition (IC);
   (ii) at least one chain extender (CE1),
   (iii) a polyol composition (PC).
   wherein the components are reacted at an index in the range from 0.99 to 1.02 and
   wherein the average molecular weight of the polyols present in the polyol composition (PC) is in the range from 1250 g/mol to 2500 g/mol.

7. The molded article according to embodiment 6, wherein the chain extender (CE1) is selected from the group consisting of ethane-1,2-diol, propane-1,3-diol, butane-1,4-diol and hexane-1,6-diol.

8. The molded article according to either of embodiments 6 and 7, wherein the polyol composition comprises a polyol selected from the group consisting of polyetherols, polyesterols and polycaprolactone polyols.

9. The molded article according to any of embodiments 6 to 8, wherein the polyol composition comprises a polyol selected from the group consisting of polytetrahydrofurans having a number-average molecular weight Mn in the range from 1400 g/mol to 2200 g/mol.

10. A process for producing a molded article (M), preferably a molded article according to any of embodiments 1 to 9, comprising the steps of:
   (a) providing a molded article (M-1), comprising a thermoplastic elastomer (TPE-1), in a mold,
   (b) filling the mold with a foamed pellet material comprising a thermoplastic elastomer (TPE-2), the thermoplastic elastomer (TPE-2) having a processing temperature TP (TPE-2),
   (c) producing the molded article (M) by welding at a temperature in the range from 100 to 170° C.,
   wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014.

11. The process according to embodiment 10, wherein the processing temperature range of the thermoplastic elastomer (TPE-2) TP (TPE-2) is in the range from 100 to 170° C.

12. The process according to either of embodiments 10 and 11, wherein the thermoplastic elastomers (TPE-1) and (TPE-2) are independently selected from thermoplastic polyurethanes, thermoplastic polyesters and thermoplastic polyamides.

13. The process according to any of embodiments 10 to 12, wherein the thermoplastic elastomer (TPE-1) has a maximum softening of less than 10% at a temperature below the processing temperature TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

14. The process according to any of embodiments 10 to 13, wherein the thermoplastic elastomer (TPE-1) and the thermoplastic elastomer (TPE-2) are selected from thermoplastic polyurethanes.

15. The process according to any of embodiments 10 to 14, wherein the thermoplastic elastomer (TPE-1) is a thermoplastic polyurethane (TPU-1) obtained or obtainable by reaction of the components (i) to (iii):
   (i) a polyisocyanate composition (IC);
   (ii) at least one chain extender (CE1),
   (iii) a polyol composition (PC),
   wherein the components are reacted at an index in the range from 0.99 to 1.02 and
   wherein the average molecular weight of the polyols present in the polyol composition (PC) is in the range from 1250 g/mol to 2500 g/mol.

16. The process according to embodiment 15, wherein the chain extender (CE1) is selected from the group consisting of ethane-1,2-diol, propane-1,3-diol, butane-1,4-diol and hexane-1,6-diol.

17. The process according to either of embodiments 15 and 16, wherein the polyol composition comprises a polyol selected from the group consisting of polyetherols, polyesterols and polycaprolactone polyols.

18. The process according to any of embodiments 10 to 17, wherein the polyol composition comprises a polyol selected from the group consisting of polytetrahydrofurans having a number-average molecular weight Mn in the range from 1400 g/mol to 2200 g/mol.

19. A molded article, preferably the molded article according to any of embodiments 1 to 9, obtained or obtainable by a process according to any of embodiments 10 to 18.

20. The use of a molded article (M-1) made of a thermoplastic elastomer (TPE-1) for producing a molded article in the presence of a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014.

21. The use according to embodiment 20, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

22. The use according to either of embodiments 20 and 21, wherein the molded article is one suitable for an application in the sports, industry, medicine, sports medicine, safety, automotive and consumer goods field.

23. The use according to any of embodiments 20 to 22, wherein the molded article is part of a shoe sole, part of a shoe, a bicycle saddle, cushioning, a mattress, underlay, grip, protective film, a component in automobile interiors and exteriors.

24. The use according to any of embodiments 20 to 23, wherein the molded article is a shoe outer sole.

25. A molded article (M) comprising a molded article (M-1) made of a thermoplastic elastomer (TPE-1) and a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014, wherein the thermoplastic elastomer (TPE-1) and the thermoplastic elastomer (TPE-2) are selected from thermoplastic polyurethanes.

26. The molded article according to embodiment 25, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

27. The molded article according to either of embodiments 25 and 26, wherein the processing temperature range of the thermoplastic elastomer (TPE-2) TP (TPE-2) is in the range from 100 to 170° C.

28. The molded article according to any of embodiments 25 to 27, wherein the thermoplastic elastomer (TPE-1) is a thermoplastic polyurethane (TPU-1) obtained or obtainable by reaction of the components (i) to (iii):
(i) a polyisocyanate composition (IC);
(ii) at least one chain extender (CE1),
(iii) a polyol composition (PC),
wherein the components are reacted at an index in the range from 0.99 to 1.02 and
wherein the average molecular weight of the polyols present in the polyol composition (PC) is in the range from 1250 g/mol to 2500 g/mol.

29. The molded article according to embodiment 28, wherein the chain extender (CE1) is selected from the group consisting of ethane-1,2-diol, propane-1,3-diol, butane-1,4-diol and hexane-1,6-diol.

30. The molded article according to either of embodiments 28 and 29, wherein the polyol composition comprises a polyol selected from the group consisting of polyetherols, polyesterols and polycaprolactone polyols.

31. The molded article according to any of embodiments 28 to 30, wherein the polyol composition comprises a polyol selected from the group consisting of polytetrahydrofurans having a number-average molecular weight Mn in the range from 1400 g/mol to 2200 g/mol.

32. A process for producing a molded article (M), preferably a molded article according to any of embodiments 25 to 31, comprising the steps of:
(a) providing a molded article (M-1), comprising a thermoplastic elastomer (TPE-1), in a mold,
(b) filling the mold with a foamed pellet material comprising a thermoplastic elastomer (TPE-2), the thermoplastic elastomer (TPE-2) having a processing temperature TP (TPE-2),
(c) producing the molded article (M) by welding at a temperature in the range from 100 to 170° C.,
wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014,
wherein the thermoplastic elastomer (TPE-1) and the thermoplastic elastomer (TPE-2) are selected from thermoplastic polyurethanes.

33. The process according to embodiment 32, wherein the thermoplastic elastomer (TPE-1) has a maximum softening of less than 10% at a temperature below the processing temperature TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

34. A molded article, preferably the molded article according to any of embodiments 25 to 31, obtained or obtainable by a process according to either of embodiments 32 and 33.

35. The use of a molded article (M-1) made of a thermoplastic elastomer (TPE-1) for producing a molded article in the presence of a foamed pellet material made of a thermoplastic elastomer (TPE-2), wherein the molded article (M-1) has a softening temperature TS (TPE-1) that deviates by no more than 25° C. from the processing temperature TP (TPE-2) of the thermoplastic elastomer (TPE-2), the softening temperature being determined by means of TMA in accordance with ISO 11359-3:2014.
wherein the thermoplastic elastomer (TPE-1) and the thermoplastic elastomer (TPE-2) are selected from thermoplastic polyurethanes.

36. The use according to embodiment 35, wherein the thermoplastic elastomer (TPE-1) has a maximum softening of less than 10% at a temperature below the processing temperature range TP (TPE-2) of the thermoplastic elastomer (TPE-2) and in the processing temperature range TP (TPE-2) of the thermoplastic elastomer (TPE-2) has a softening in the range from 3% to 12%, the softening being determined by means of TMA in accordance with ISO 11359-3:2014 (weight 15 g, heating rate 20 K/min, round ram of diameter 3 mm, TPU sample geometry: diameter 4 mm and thickness 2 mm).

37. The use according to either of embodiments 35 and 36, wherein the molded article is one suitable for an application in the sports, industry, medicine, sports medicine, safety, automotive and consumer goods field.

38. The use according to any of embodiments 35 to 37, wherein the molded article is part of a shoe, part of a shoe sole, a bicycle saddle, cushioning, a mattress, underlay, grip, protective film, a component in automobile interiors and exteriors.

39. The use according to any of embodiments 35 to 38, wherein the molded article is a shoe outer sole.

BRIEF DESCRIPTION OF THE DRAWING

The FIGURE: shows the results of the TMA measurements (heating rate 20 K/min). The depth in % (y axis) is plotted against the temperature in ° C. (x axis). Shown are examples 1, 2, 4, 5 and 6 and also comparative examples 1 to 4. Measurements were performed directly on the non-heat-treated outer soles. Only in the case of comparative examples 1 and 2 was the sole heat treated at 70° C. for 10 h prior to the TMA measurement.

The examples that follow serve to illustrate the invention but are in no way limiting with regard to the subject matter of the present invention.

EXAMPLES

1. Starting Materials

The following starting materials were used:

Polyol 1: polyether polyol having a number-average molar mass of 1 kg/mol and exclusively primary OH groups (based on tetramethylene oxide, functionality: 2)

Polyol 2: polyether polyol having a number-average molar mass of 2 kg/mol and exclusively primary OH groups (based on tetramethylene oxide, functionality: 2)

Isocyanate 1: aromatic isocyanate (4,4'-methylenediphenyl diisocyanate)

CE 1: butane-1,4-diol

Plasticizer 1: acetyl tributyl citrate, abbreviated to ATBC, also referred to hereinafter as P1

Catalyst 1: tin(II) isooctoate (50% in dioctyl adipate)

Stabilizer 1: sterically hindered phenol

Processing auxiliary 1: ethylenebisstearoylamide, hereinafter also referred to as PA1

Crosslinker 1: TPU 1, which in a separate extrusion step was reacted with 40% of a 2.4 functional prepolymer based on 4,4'-methylenediphenyl diisocyanate (MDI), polymeric MDI and a polyether polyol having a number-average molar mass of 0.5 kg/mol and exclusively primary OH groups (based on tetramethylene oxide, functionality: 2), the residual NCO of which is 28.5 g/100 g (ASTM D 5155-96).

1.1 Preparation of TPU 1

A mixture of 5.72 percent by mass of butane-1,4-diol and 62.72 percent by mass of polytetrahydrofuran having a number-average molar mass Mn of 1000 g/mol was heated to 70° C. and mixed in a mixing head intensively with 31.56 percent by mass of diphenylmethane 4,4'-diisocyanate in the presence of 1.0 percent by mass of Crodamide EBS wax based on the first three components. The reaction mixture obtained was applied to a circulating PTFE belt at a temperature of 90° C. The reaction mixture that had solidified to form a solid slab at the end of the belt was fed continuously at about 80° C. via intake rolls directly to a comminution and homogenization apparatus. It was comminuted therein at temperatures of about 105° C. and conveyed to a single-shaft extruder connected thereto by a tangential flange. The barrel temperatures were about 17° C. to 19° C. in the intake region, and 190 to 220° C. in the middle zone. The melt that exited at the die plate was processed by means of underwater pelletization to give homogeneous lenticular pellets having a mass of 32 mg and then dried.

1.2 Preparation of the eTPU

In an impregnation vessel with a degree of filling of 80%, the TPU 1 pellets were added to a mixture of water with calcium carbonate and a surface-active substance such that the solid/liquid phase ratio was 0.32. The gas-tight vessel was first purged with nitrogen before the blowing agent butane was injected in the amounts indicated in the table, based on the solid phase (TPU). The vessel was heated while stirring the solid/liquid phase, and at a temperature of 50° C. the vessel was pressurized with a defined amount of nitrogen to a pressure of 8 bar. The mixture was then further heated up to the desired impregnation temperature (IMT). On reaching the impregnation temperature and impregnation pressure, the pressure in the vessel was released via a valve after a specified hold time. The precise production parameters for the experiments and the bulk densities achieved are listed in the following table 1.

TABLE 1

| Name | Blowing agent concentration based on amount of solid phase (% by wt.) | Hold time (range IMT −5° C. to IMT +2° C.) (min) | IMT (° C.) | Bulk density (g/L) |
|---|---|---|---|---|
| eTPU 1 | 30 | 9 | 120 | 106 |

2. Production of Comparative Examples+Examples (Compact TPU)

2.1 Production Process 1—(2-Stage Process Comprising First Step, Reactive Extrusion Process without Plasticizer, with Polyol Mixture, and Second Step, Incorporation of P1 on Twin-Screw Extruder), Process for Continuous Synthesis of Comparative Example 1

A mixture of CE1, processing auxiliary 1, stabilizer 1, polyol 1 and polyol 2, on the one hand, was metered at a charge temperature of 150° C. into the first barrel of a ZSK 92 twin-screw extruder from Werner & Pfleiderer, Stuttgart, having a processing length of 56 D and, separately from this, isocyanate 1 was metered at a charge temperature of 65° C. into the first barrel of this same extruder. The speed of the twin screw was 280 rpm. The set temperature values for the barrels in the downstream direction were 190° C. in the first third of the screw and 190° C. in the second and third thirds of the screw. The output was 850 kg/h. In this way, the thermoplastic polyurethane (TPU) is synthesized in the known reaction extruder process. The pelletizable reaction melt thus obtained can be formed into lenticular pellets in the subsequent process—what is known as underwater pelletization. The pellets are dried by subsequent aftertreatment at approximately 80 to 90° C. and they are thereafter packaged in transportable containers. The preliminary product 1 obtained from this is processed further as described below.

Preliminary product 1 is metered at a charge temperature of approximately 30° C. into the first barrel of a ZE 65 twin-screw extruder from Berstorff, having a processing length of 42 D. Separately from this, plasticizer 1 is metered at a charge temperature of 40° C. into the fourth barrel of this same extruder. The speed of the twin screw is 160 rpm. The set temperature values for the barrels in the downstream direction are 190° C. in the first third of the screw and 170° C. in the second and third thirds of the screw. The output is 300 kg/h. In this way, the thermoplastic polyurethane (TPU) is synthesized in the known compounding process. The pelletizable polymer melt thus obtained can be formed into lenticular pellets in the subsequent process—what is known as underwater pelletization. The pellets are dried by subsequent aftertreatment at approximately 80° C. and they are thereafter packaged in transportable containers, in this case 25 kg PE bags.

The TPU pellets thus obtained are pre-dried at 80 to 100° C. for 3 h prior to further processing, and then formed into test specimens by injection molding. The zone temperatures of the injection molding units used for this purpose are between 190° C. and 220° C. S2 test bars are stamped out from the specimen panels thus obtained and are subjected to further mechanical tests. In addition, the chemical values, such as for example molar mass, of these test specimens are determined.

2.2 Production Process 2—Dry Blend, i.e. Mixing of TPU Pellets with Crosslinker 1, Process for Continuous Synthesis of Comparative Example 2

98.5 parts by weight of TPU pellets produced as under 2.1 are pre-dried at 80 to 100° C. for 3 h for further processing and subsequently mixed with 1.5 parts by weight of crosslinker 1.

The TPU pellet mixture thus obtained is formed into test specimens by injection molding. The zone temperatures of the injection molding units used for this purpose are between 190° C. and 220° C. S2 test bars are stamped out from the specimen panels thus obtained and are subjected to further mechanical tests. In addition, the chemical values, such as for example molar mass, of these test specimens are determined.

The synthesis and properties of the thermoplastic polyurethanes obtained are summarized in tables 2 and 3. The samples produced using these processes serve as comparative examples 1+2.

TABLE 2

| Synthesis of comparative examples 1 + 2: | | | |
|---|---|---|---|
| | Preliminary product 1 | Comparative example 1 | Comparative example 2 |
| Polyol 1 [g] | 500 | | |
| Polyol 2 [g] | 500 | | |
| Isocyanate 1 [g] | 372 | | |
| CE 1 [g] | 65 | | |
| Stabilizer 1 [g] | 14.5 | | |
| Preliminary product 1 [g] | | 850 | |
| Plasticizer 1 [g] | | 150 | |
| Processing auxiliary 1 [g] | <1 | | |
| Comparative example 1 [g] | | | 985 |
| Crosslinker 1 [g] | | | 15 |
| Index | 1010 | — | — |

TABLE 3

| Properties of comparative examples 1 + 2: | | |
|---|---|---|
| | Comparative example 1 | Comparative example 2 |
| Shore A | 62 | 63 |
| Tensile strength [MPa] | 26 | 27 |
| Elongation at break [%] | 975 | 890 |
| Tear propagation resistance [kN/m] | 41 | 45 |
| Abrasion [mm³] | 60 | 53 |
| GPC molar mass [$10^3$ daltons] | 125 | 260 |

2.3 Production Process 3—(Single-Stage Reactive Extrusion Process with P1+Polyol Mixture), Process for Continuous Synthesis of Comparative Example 3 and Example 3

A mixture of CE1, processing auxiliary 1, stabilizer 1, polyol 1 and polyol 2, on the one hand, was metered at a charge temperature of 150° C. into the first barrel of a ZSK 92 twin-screw extruder from Werner & Pfleiderer, Stuttgart, having a processing length of 56 D and, separately from this, isocyanate 1 was metered at a charge temperature of 65° C. into the first barrel of this same extruder. Separately from this, plasticizer 1 is metered at a charge temperature of 40° C. into a downstream barrel in the final third of this same extruder. The speed of the twin screw was 280 rpm. The set temperature values for the barrels in the downstream direction were 190° C. in the first third of the screw and 170° C. in the second and third thirds of the screw. The output was 600 kg/h. In this way, the thermoplastic polyurethane (TPU) is synthesized in the known reaction extruder process. The pelletizable reaction melt thus obtained can be formed into lenticular pellets in the subsequent process—what is known as underwater pelletization. The pellets are dried by subsequent aftertreatment at approximately 80 to 90° C. and they are thereafter packaged in transportable containers.

The TPU pellets thus obtained are pre-dried at 80 to 100° C. for 3 h prior to further processing, and then formed into test specimens by injection molding. The zone temperatures of the injection molding units used for this purpose are between 190° C. and 220° C. S2 test bars are stamped out from the specimen panels thus obtained and are subjected to further mechanical tests. In addition, the chemical values, such as for example molar mass, of these test specimens are determined.

2.4 Production Process 4—(Single-Stage Reactive Extrusion Process with P1+a Polyol), Process for Continuous Synthesis of Comparative Example 4 and Examples 1, 2, 4, 5, 6 and 7

A mixture of CE1, processing auxiliary 1, stabilizer 1 and polyol 2, on the one hand, was metered at a charge temperature of 150° C. into the first barrel of a ZSK 92 twin-screw extruder from Werner & Pfleiderer, Stuttgart, having a processing length of 56 D and, separately from this, isocyanate 1 was metered at a charge temperature of 65° C. into the first barrel of this same extruder. Separately from this, plasticizer 1 is metered at a charge temperature of 40° C. into a downstream barrel in the final third of this same extruder. The speed of the twin screw was 280 rpm. The set temperature values for the barrels in the downstream direction were 190° C. in the first third of the screw and 170° C. in the second and third thirds of the screw. The output was 600 kg/h. In this way, the thermoplastic polyurethane (TPU) is synthesized in the known reaction extruder process. The pelletizable reaction melt thus obtained can be formed into lenticular pellets in the subsequent process—what is known as underwater pelletization. The pellets are dried by subsequent aftertreatment at approximately 80 to 90° C. and they are thereafter packaged in transportable containers.

The TPU pellets thus obtained are pre-dried at 80 to 100° C. for 3 h prior to further processing, and then formed into test specimens by injection molding. The zone temperatures of the injection molding units used for this purpose are between 190° C. and 220° C. S2 test bars are stamped out from the specimen panels thus obtained and are subjected to further mechanical tests. In addition, the chemical values, such as for example molar mass, of these test specimens are determined.

The synthesis and properties of the thermoplastic polyurethanes obtained are summarized in tables 4, 5, 6 and 7. The samples produced using these processes serve as comparative examples 3 and 4 and also examples 1, 2, 4, 5, 6 and 7.

TABLE 4

Synthesis of comparative examples 3 + 4:

| | Comparative example 3 | Comparative example 4 |
|---|---|---|
| Polyol 1 [g] | 500 | |
| Polyol 2 [g] | 500 | 1000 |
| Isocyanate 1 [g] | 295 | 295 |
| CE 1 [g] | 35.6 | 59.0 |
| Stabilizer 1 [g] | 15.8 | 16.1 |
| Plasticizer 1 [g] | 237.6 | 241.8 |
| Processing auxiliary 1 [g] | <1 | <1 |
| Index | 1030 | 1022 |

TABLE 5

Properties of comparative examples 3 + 4:

| | Comparative example 3 | Comparative example 4 |
|---|---|---|
| Shore A | 65 | 64 |
| Tensile strength [MPa] | 34 | 23 |
| Elongation at break [%] | 700 | 590 |
| Tear propagation resistance [kN/m] | 42 | 31 |
| Abrasion [mm³] | 39 | 31 |
| GPC molar mass [10³ daltons] | 200 | 257 |

TABLE 6

Synthesis of examples 1, 2, 3, 4, 5, 6 and 7:

| | Ex. 1 | Ex. 2 | Ex. 3 | Ex. 4 | Ex. 5 | Ex. 6 | Ex. 7 |
|---|---|---|---|---|---|---|---|
| Polyol 1 [g] | | | 850 | Dry | Dry | Dry | |
| Polyol 2 [g] | 1000 | 1000 | 150 | blend of | blend of | blend of | 1000 |
| Isocyanate 1 [g] | 295 | 295 | 340 | comparative | comparative | comparative | 295 |
| CE 1 [g] | 61.6 | 61.3 | 70.6 | example | example | example | 61.3 |
| Stabilizer 1 [g] | 16.1 | 16.1 | 16.8 | 4 & | 4 & | 4 & | 16.1 |
| Plasticizer 1 [g] | 242.2 | 242.2 | 251.9 | example | example | example | 242.2 |
| PA1 [g] | <1 | <1 | <1 | 1 (mass | 1 (mass | 1 (mass | <1 |
| Index | 1009 | 1012 | 1020 | ratio 2:1) | ratio 1:1) | ratio 1:2) | 1000 |
| Calculated index | | | | 1016 | 1013 | 1007 | |

TABLE 7

Properties of examples 1, 2, 3, 4, 5, 6 and 7:

| | Ex. 1 | Ex. 2 | Ex. 3 | Ex. 4 | Ex. 5 | Ex. 6 | Ex. 7 |
|---|---|---|---|---|---|---|---|
| Shore A | 62 | 62 | 66 | 63 | 63 | 61 | 62 |
| Tensile strength [MPa] | 37 | 38 | 28 | 41 | 33 | 33 | 32 |
| Elongation at break [%] | 990 | 990 | 650 | 960 | 860 | 880 | 740 |
| Tear propagation resistance [kN/m] | 41 | 44 | 32 | 40 | 40 | 44 | 44 |
| Abrasion [mm³] | 40 | 38 | 35 | 32 | 35 | 38 | 30 |
| GPC molar mass [10³ daltons] | 150 | 160 | 248 | 233 | 211 | 180 | 155 |

Molded articles (M-1) were produced from the TPU pellet materials described (examples and comparative examples) in an injection molding process. To this end, the pellets are pre-dried at 80 to 100° C. for 3 h before injection molding and then formed into the molded article (M-1) by injection molding. The zone temperatures of the injection molding units used for this are between 190° C. and 220° C. The molded article (M-1) obtained is optionally subjected to maturation (annealing by heat treatment, 10 h at 70° C.), as noted in table 8.

The final molded article (M) is produced in a number of substeps:

a. the molded article (M-1), which has holes through which the water vapor can pass, is inserted into a mold of a water vapor molding machine from Kurtz (Boost Foamer)

b. the foamed pellet material eTPU 1 is filled in c. the eTPU 1 is exposed to water vapor and subjected to welding with itself and with the molded article M-1 at a temperature of from 130 to 135° C.

d. the final M is annealed at 70° C. for 4 hours.

The property characteristics described in table 8 were evaluated as follows:

1. The shape retention was evaluated visually on the molded article (M-1) after the molded article M had been obtained. The label "poor" denotes a change in the structure of M-1, such as for example in edge sharpness, deformation, gloss or flowing of the structure, which results in a deterioration in the visual appearance of the surface.

2. A 10 mm strip was cut out from the molded article M every two centimeters around it. After a gap had been introduced into the molded article M, the adhesion was determined by measuring the tensile strength. To this end, the molded article M-1 and the welded pellet material were pulled apart in opposite directions at a rate of 100 mm/min in a tensile testing machine. "Good" denotes a sample which has a tensile strength in this test of greater than 2.7 N/mm.
3. The storage stability refers to the change in the TPU pellet material after synthesis but before processing. The label "poor" denotes excessive change in the sample consistency.
4. Process stability refers to the consistency of the process for producing M-1 and the change therein over time. The label "poor" denotes excessive change in the process consistency.
5. The thermomechanical analysis (TMA) was effected in accordance with ISO 11359 (2014), heating rate 20 K/min, weight 15 g, round ram of diameter 3 mm, TPU sample geometry: diameter 4 mm and thickness 2 mm.

It was possible to determine two areas (zone (1) and zone (2), shown in the FIGURE), which are characteristic for the evaluation of the adhesion in the case of a process in which foamed particles are welded in the presence of a component, or of the shape retention of the contours of the components.

24 shape and that the shrinkage of M-1 is less pronounced. To this end, these samples are heat treated at 70° C. for 10 h.

3. Measurement Methods/Standards

Shore A: DIN ISO 7619-1 (February 2012)
Tensile strength DIN 53504 (March 2017), national for Germany, international DIN EN ISO 527-2 (June 2012)
Elongation at break DIN 53504 (March 2017), national for Germany, international DIN EN ISO 527-2 (June 2012)
Tear propagation resistance: (with notch) DIN ISO 34-1, B (b) (September 2016)
Abrasion determination DIN ISO 4649 (March 2014)
Gel permeation chromatography (GPC): DIN 55672-2 (2008), samples were completely dissolved at 80° C. to 0.5% in amine-containing DMF beforehand. DMF was also used as flow agent.
Thermomechanical analysis (TMA): ISO 11359 (2014), heating rate 20 K/Min, weight 15 g, round ram of diameter 3 mm, TPU sample geometry: diameter 4 mm and thickness 2 mm

LITERATURE CITED

Ullmann's "Encyklopädie der technischen Chemie" [Encyclopedia of Industrial Chemistry], 4th edition, volume 20, pp. 416 ff

TABLE 8

Production of the molded article (M) from, inter alia, eTPU 1.

| | Index of the TPU | Crosslinker 1 present in TPU | GPC* Molar mass [kD] | TMA Zone 1 | TMA Zone 2 | Shape retention | Adhesion | Storage stability | Process stability | Annealing of M-1 by heat treatment (10 h at 70° C.) |
|---|---|---|---|---|---|---|---|---|---|---|
| Comparative ex. 1 | 1010 | — | 125 | no | yes | poor | good | good | good | Required |
| Comparative ex. 2 | 1010 | 1.5 | 260 | yes | yes | good | good | good | poor | Required |
| Comparative ex. 3 | 1030 | — | 200 | no | yes | poor | good | poor | good | Not required |
| Comparative ex. 4 | 1022 | — | 257 | yes | no | good | poor | poor | good | Not required |
| Example 1 | 1009 | — | 150 | yes | yes | good | good | good | good | Not required |
| Example 2 | 1012 | — | 160 | yes | yes | good | good | good | good | Not required |
| Example 3 | 1020 | — | 248 | | | good | good | poor | good | Not required |
| Example 4 | 1016 | — | 233 | yes | yes | good | good | poor | good | Not required |
| Example 5 | 1013 | — | 211 | yes | yes | good | good | poor | good | Not required |
| Example 6 | 1007 | — | 180 | yes | yes | good | good | poor | good | Not required |
| Example 7 | 1000 | — | 155 | | | good | good | good | good | Not required |

*of matured material (6 weeks at RT)

The results show that good products are obtained using a thermoplastic polyurethane based on PTHF with an Mn>1500 g/mol and an index of 1020 is not exceeded during the production.

As shown by comparative example 2 in particular, when using crosslinker 1, the high sensitivity of crosslinker 1 results in problems in production which are reflected, for example, in shrinkage of the sole. This means that the soles have to undergo additional heat treatment, which is more expensive. The heat treatment of the soles (M-1) was adapted for these samples so that when producing the final molded article M the soles no longer exhibit any change in WO 94/20568 A1
WO 2007/082838 A1
"Polymer Chemistry", Interscience Publ., New York, 1961, pp. 111-127
"Kunststoffhandbuch" [Plastics handbook], volume VIII. C. Hanser Verlag, Munich 1973 Journal of Polymer Science, Part A1, 4, pages 1851-1859 (1966)
Kunststoffhandbuch, volume 7, "Polyurethane", Carl Hanser Verlag, 3rd edition, 1993, chapter 3.1
Kunststoffhandbuch, volume VII. Vieweg and Höchtlen, Carl Hanser Verlag, 1966, pp. 103-113
WO 2007/118827 A1

The invention claimed is:

1. A molded article (M), comprising:

a molded article (M-1) made of a thermoplastic elastomer (TPE-1), and a foamed pellet material made of a thermoplastic elastomer (TPE-2), wherein the molded article (M-1) has a softening temperature TS (TPE-1) that deviates by no more than 25° C. from a processing temperature range TP (TPE-2) of the thermoplastic elastomer (TPE-2), the softening temperature TS (TPE-1) being determined by thermomechanical analysis (TMA) in accordance with ISO 11359-3:2014, wherein the processing temperature range TP (TPE-2) is a range from 100 to 170° C., wherein the thermoplastic elastomer (TPE-1) is in compact form, and wherein the thermoplastic elastomer (TPE-1) and the thermoplastic elastomer (TPE-2) are each independently selected from the group consisting of a thermoplastic polyurethane, a thermoplastic polyetheramide, a polyetherester, and a polyesterester.

2. The molded article according to claim 1, wherein the thermoplastic elastomer (TPE-1) has a maximum softening of less than 10% at a temperature below the processing temperature range TP (TPE-2), and in the processing temperature range TP (TPE-2) has a softening in a range from 3% to 12%, the softening being determined by TMA in accordance with ISO 11359-3:2014.

3. The molded article according to claim 1, wherein the thermoplastic elastomer (TPE-1) and the thermoplastic elastomer (TPE-2) are each independently selected from the group consisting of a thermoplastic polyurethane, a thermoplastic polyester, and a thermoplastic polyamide.

4. The molded article according to claim 1, wherein the thermoplastic elastomer (TPE-1) and the thermoplastic elastomer (TPE-2) are each independently a thermoplastic polyurethane.

5. The molded article according to claim 1, wherein the thermoplastic elastomer (TPE-1) is a thermoplastic polyurethane (TPU-1) obtained by reaction of the components (i) to (iii):

(i) a polyisocyanate composition (IC);

(ii) at least one chain extender (CE1), and (iii) a polyol composition (PC), wherein the components (i) to (iii) are reacted at an index in a range from 0.99 to 1.02, and wherein an average molecular weight of polyols present in the polyol composition (PC) is in a range from 1250 g/mol to 2500 g/mol.

6. The molded article according to claim 5, wherein the at least one chain extender (CE1) is at least one selected from the group consisting of ethane-1,2-diol, propane-1,3-diol, butane-1,4-diol, and hexane-1,6-diol.

7. The molded article according to claim 5, wherein the polyol composition (PC) comprises at least one polyol selected from the group consisting of a polyetherol, a polyesterol, and a polycaprolactone polyol.

8. The molded article according to claim 5, wherein the polyol composition (PC) comprises at least one polytetrahydrofuran having a number-average molecular weight Mn in a range from 1400 g/mol to 2200 g/mol.

9. A process for producing the molded article (M) according to claim 1, comprising:

(a) providing a molded article (M-1), comprising a thermoplastic elastomer (TPE-1), in a mold, (b) filling the mold with a foamed pellet material comprising a thermoplastic elastomer (TPE-2), the thermoplastic elastomer (TPE-2) having a processing temperature range TP (TPE-2), and (c) producing the molded article (M) by welding at a temperature in a range from 100 to 170° C., wherein the molded article (M-1) has a softening temperature TS (TPE-1) that deviates by no more than 25° C. from the processing temperature range TP (TPE-2), the softening temperature TS (TPE-1) being determined by thermomechanical analysis (TMA) in accordance with ISO 11359-3:2014, and the processing temperature range TP (TPE-2) being a range from 100 to 170° C., wherein the thermoplastic elastomer (TPE-1) is in compact form, and wherein the thermoplastic elastomer (TPE-1) and the thermoplastic elastomer (TPE-2) are each independently selected from the group consisting of a thermoplastic polyurethane, a thermoplastic polyetheramide, a polyetherester, and a polyesterester.

10. The process according to claim 9, wherein the thermoplastic elastomer (TPE-1) has a maximum softening of less than 10% at a temperature below the processing temperature range TP (TPE-2), and in the processing temperature range TP (TPE-2) has a softening in a range from 3% to 12%, the softening being determined by TMA in accordance with ISO 11359-3:2014.

11. The process according to claim 9, wherein the thermoplastic elastomer (TPE-1) and the thermoplastic elastomer (TPE-2) are each independently a thermoplastic polyurethane.

12. A molded article, obtained by the process according to claim 9.

13. A method, comprising:

producing the molded article (M) according to claim 1 with a molded article (M-1) in the presence of a foamed pellet material made of a thermoplastic elastomer (TPE-2), wherein the molded article (M-1) has a softening temperature TS (TPE-1) that deviates by no more than 25° C. from a processing temperature range TP (TPE-2) of the thermoplastic elastomer (TPE-2), the softening temperature being determined by thermomechanical analysis (TMA) in accordance with ISO 11359-3:2014, wherein the processing temperature range TP (TPE-2) is a range from 100 to 170° C., wherein the thermoplastic elastomer (TPE-1) is in compact form, and wherein the thermoplastic elastomer (TPE-1) and the thermoplastic elastomer (TPE-2) are each independently selected from the group consisting of a thermoplastic polyurethane, a thermoplastic polyetheramide, a polyetherester, and a polyesterester.

14. The method according to claim 13, wherein the thermoplastic elastomer (TPE-1) has a maximum softening of less than 10% at a temperature below the processing temperature range TP (TPE-2), and in the processing temperature range TP (TPE-2) has a softening in a range from 3% to 12%, the softening being determined by TMA in accordance with ISO 11359-3:2014.

15. The method according to claim 13, wherein the molded article (M) is suitable for application in the sports, industry, medicine, sports medicine, safety, automotive, and/or consumer goods field.

16. The method according to claim 13, wherein the molded article (M) is part of a shoe sole, a bicycle saddle, cushioning, a mattress, an underlay, a grip, a protective film, or a component in automobile interiors and exteriors.

17. The method according to claim 13, wherein the molded article (M) is a shoe outer sole.

\* \* \* \* \*